United States Patent [19]

Jones et al.

[11] Patent Number: 5,708,576
[45] Date of Patent: Jan. 13, 1998

[54] FAULT TOLERANT POWER CONVERTER

[75] Inventors: Stephen R. Jones, Winnebago; Waleed M. Said, Rockford, both of Ill.

[73] Assignee: Sundstrand Corporation, Rockford, Ill.

[21] Appl. No.: 680,580

[22] Filed: Jul. 10, 1996

[51] Int. Cl.$^6$ ................................................. H02H 7/122
[52] U.S. Cl. .......................... 363/56; 318/701; 363/65
[58] Field of Search .............................. 363/50, 55, 56, 363/65, 71; 318/701

[56] References Cited

U.S. PATENT DOCUMENTS

| | | | |
|---|---|---|---|
| 4,611,157 | 9/1986 | Miller et al. | 318/696 |
| 4,642,543 | 2/1987 | MacMinn | 318/696 |
| 4,772,839 | 9/1988 | MacMinn et al. | 318/696 |
| 4,959,596 | 9/1990 | MacMinn et al. | 318/254 |
| 5,097,190 | 3/1992 | Lyons et al. | 318/701 |
| 5,140,244 | 8/1992 | Lyons et al. | 318/701 |
| 5,296,785 | 3/1994 | Miller | 318/254 |
| 5,381,081 | 1/1995 | Radun | 318/701 |
| 5,404,091 | 4/1995 | Radun | 318/701 |
| 5,488,531 | 1/1996 | Aldridge et al. | 363/65 |
| 5,491,622 | 2/1996 | Carosa | 363/56 |
| 5,493,195 | 2/1996 | Heglund et al. | 318/701 |
| 5,499,186 | 3/1996 | Carosa | 363/56 |

OTHER PUBLICATIONS

*Design and Implementation of a Five Horsepower, Switched Reluctance, Fuel–Lube, Pump Motor Drive for a Gas Turbine Engine* written by Caio A. Ferreira, Stephen R. Jones, Barry T. Drager and William S. Heglund, IEEE Ninth Annual Applied Power Electronics Conference and Exposition, Feb. 13–17, 1994.

*Practical Indirect Position Sensing for a Variable Reluctance Motor* written by Walter D. Harris and submitted to the Massachusetts Institute of Technology, May 1987.

*A Simple Motion Estimator for Variable–Reluctance Motors*, written by Walter D. Harris and Jeffrey H. Lang, published in IEEE, vol. 26, No. 2, Mar./Apr. 1990.

*Low Cost Sensorless Switched Reluctance Motor Drives For Automotive Applications* written by M. Ehsani and I. Husain, (members IEEE) Power Electronics Laboratory, Dept. Of Electrical Engineering, Texas A&M University, College Station, TX. pp. 96–101.

*Application of Sensor Integration Techniques to Switched Reluctance Motor Drives* written by Stephen R. MacMinn, William J. Rzesos, Paul M. Szczesny and Thomas M. Jahns, published in IEEE vol. 28, No. 6, Nov./Dec. 1992.

*An Analysis of the Error in Indirect Rotor Position Sensing of Switched Reluctance Motors*, written by M. Ehsani, I. Husain and K.R. Ramani, Department of Electrical Engineering, Texas A&M University, College Station, Texas.

*A Comparative Analysis of SRM Discrete Shaft Position Sensor Elimination by FM Encoder and Pulsed Impedance Sensing Schemes*, written by M. Ehsani, Dept. Of Electrical Engineering, Texas A&M University, College Station, Texas.

*New Modulation Encoding Techniques for Indirect Rotor Position Sensing in Switched Reluctance Motors*, written by Mehrdad Ehsani, Iqbal Husain, S. Mahajan, and K.R. Ramani, published in IEEE, vol. 30, No. 1, Jan./Feb. 1994.

*Flux/Current Methods for SRM Rotor Position Estimation*, written by J.P. Lyons, S.R. MacMinn and M.A. Preston, published in May 1991 IEEE.

*Primary Examiner*—Stuart N. Hecker
*Attorney, Agent, or Firm*—Marshall, O'Toole, Gerstein, Murray & Borun

[57] ABSTRACT

A power converter having fault tolerant capability for use with a switched relucance machine isolates power converter legs in the event of a failed component coupled to the DC bus of the power converter.

12 Claims, 5 Drawing Sheets

FAULT TOLERANT POWER CONVERTER

BACKGROUND AND SUMMARY OF THE INVENTION

The present invention relates generally to power converters and, more particularly, to a power converter having fault tolerant capabilities.

The aerospace industry has consistently driven the leading edge of technology with the requirement for lightweight, high efficiency, and high reliability equipment. The equipment must be lightweight because each additional pound of weight translates directly into increased fuel burn, and therefore, a higher cost of ownership and shorter range. The need for high efficiency results from the fact that each additional cubic inch required for equipment displaces the amount of revenue-generating cargo and passengers that can be carried on an aircraft. High reliability is important because every minute of delay at the gate increases the cost of ownership, and likewise, increases passenger frustration.

Aircraft have typically used synchronous brushless AC generators or permanent magnet generators for electric power generation needs. As an alternative to the use of the synchronous AC or the permanent magnet generator, a switched reluctance machine can be used. Because of the physical separation of the phase windings and the lack of permanent magnets and rotating rectifiers, such machines are inherently fault tolerant. Further, such machines are often used with a power converter having a bridge topology that provides a degree of fault-tolerance in that a failure of a power switch in a converter leg does not preclude the continuing operation of other legs of the converter.

However, a failure of a DC link capacitor or other component(s) resulting in a short circuit across the DC link of the power converter will result in a protection event, thus shutting down the entire power converter.

Accordingly, it is an object of the present invention to provide a fault tolerant power converter.

It is further an object of the present invention to provide a power converter having a modular design which allows faults to be isolated so that the power converter can continue to operate under fault conditions.

Another object of the present invention is to provide a power converter for a switched reluctance machine which provides increased fault tolerant capability such that continued machine operation can be maintained even in the event of a component failure which would result in a short circuit across the DC link.

It is still further an object of the present invention to provide the fault-tolerant operation noted above using isolation means which is reliable and low in cost.

Yet another object is to provide the above-noted fault tolerant capability with only a modest increase in component count.

These and other objects and advantages are obtained by adapting a modularized approach to the design of a power converter for a switched reluctance machine. Each module comprises one phase of the power converter and includes power converter components including power switches, power diodes, gate drive circuitry and a module capacitor having 1/nth of the required DC link capacitance, where n is the number of power converter phases. In the event of a failure of the module capacitor, or other component which would result in a short across the DC link, isolating means forming a part of the module disconnects the module from a DC link, thereby isolating the fault and permitting remaining power converter modules to continue to operate.

In accordance with specific aspects of the present invention, the power converter may be either of the hard-switching or soft-switching type. In the latter case, a resonant converter configuration can be used.

The present invention significantly improves the fault tolerant capability of the switched reluctance machine power converter, in turn leading to overall improved reliability.

These and other objects, advantages and novel features of the present invention will become apparent in those skilled in the art from the drawings and following detailed description.

DESCRIPTION OF THE PREFERRED EMBODIMENTS

Figure 1:
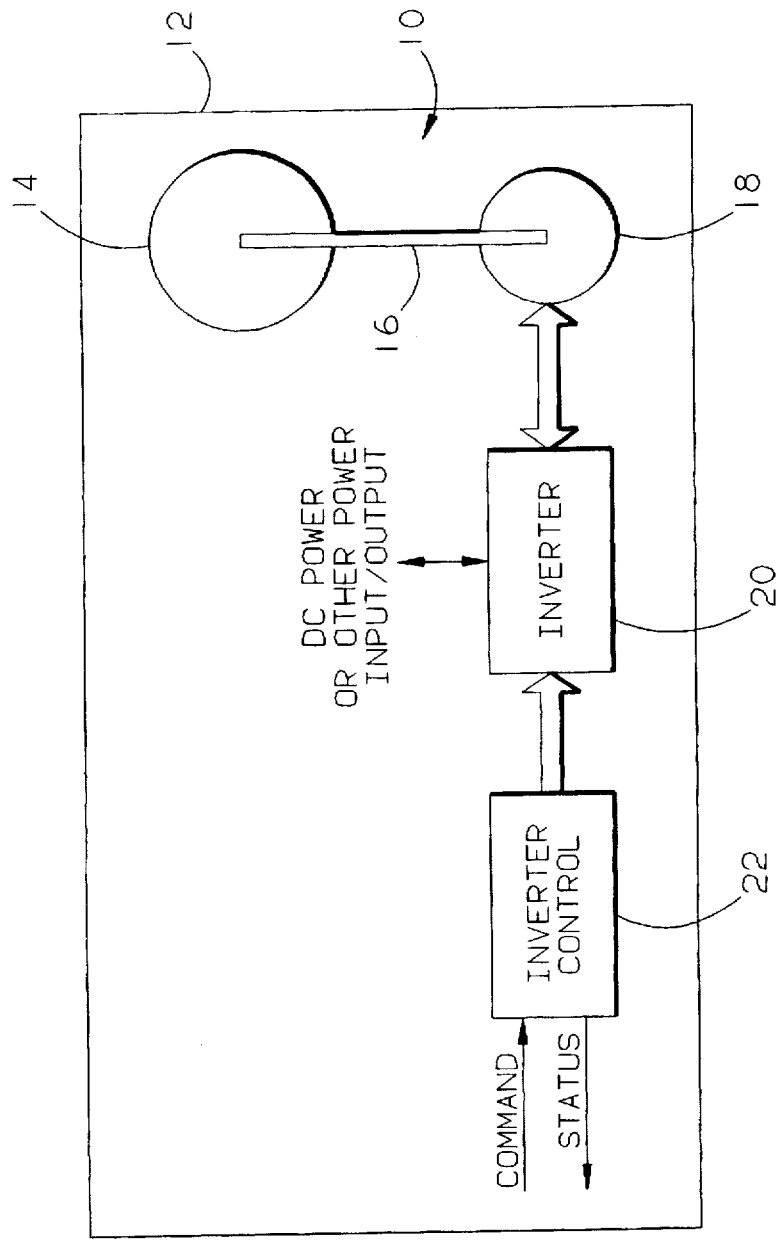
FIG. 1 comprises a block diagram of a switched reluctance machine system for an aircraft.

Referring first to FIG. 1, a power conversion system 10 is provided on board an aircraft (shown diagrammatically at 12) or other aerospace, land or water vehicle and includes a prime mover, for example, a gas turbine engine 14, which is coupled by a motive power shaft 16 to a switched reluctance machine 18. The machine 18 includes phase windings which are coupled to a power converter in the form of an inverter 20 operated by an inverter control 22. The system 10 of FIG. 1 is operable either in a starting mode of operation or in a generating mode of operation. In the starting mode of operation, DC power is supplied to the inverter 20 and the inverter control 22 develops control signals for switches in the inverter 20 to cause the switched reluctance machine 18 to operate as a motor and supply motive power via the shaft 16 to the gas turbine engine 14 for starting purposes. During operation in the generating mode, motive power is supplied by the gas turbine engine 14 to the switched reluctance machine 18 via the shaft 16 and the resulting electrical power developed by the switched reluctance machine 18 is converted by the inverter 20 into DC power for one or more loads. If necessary or desirable, the inverter 20 could be modified to develop constant frequency AC power for one or more AC loads.

Figure 2:
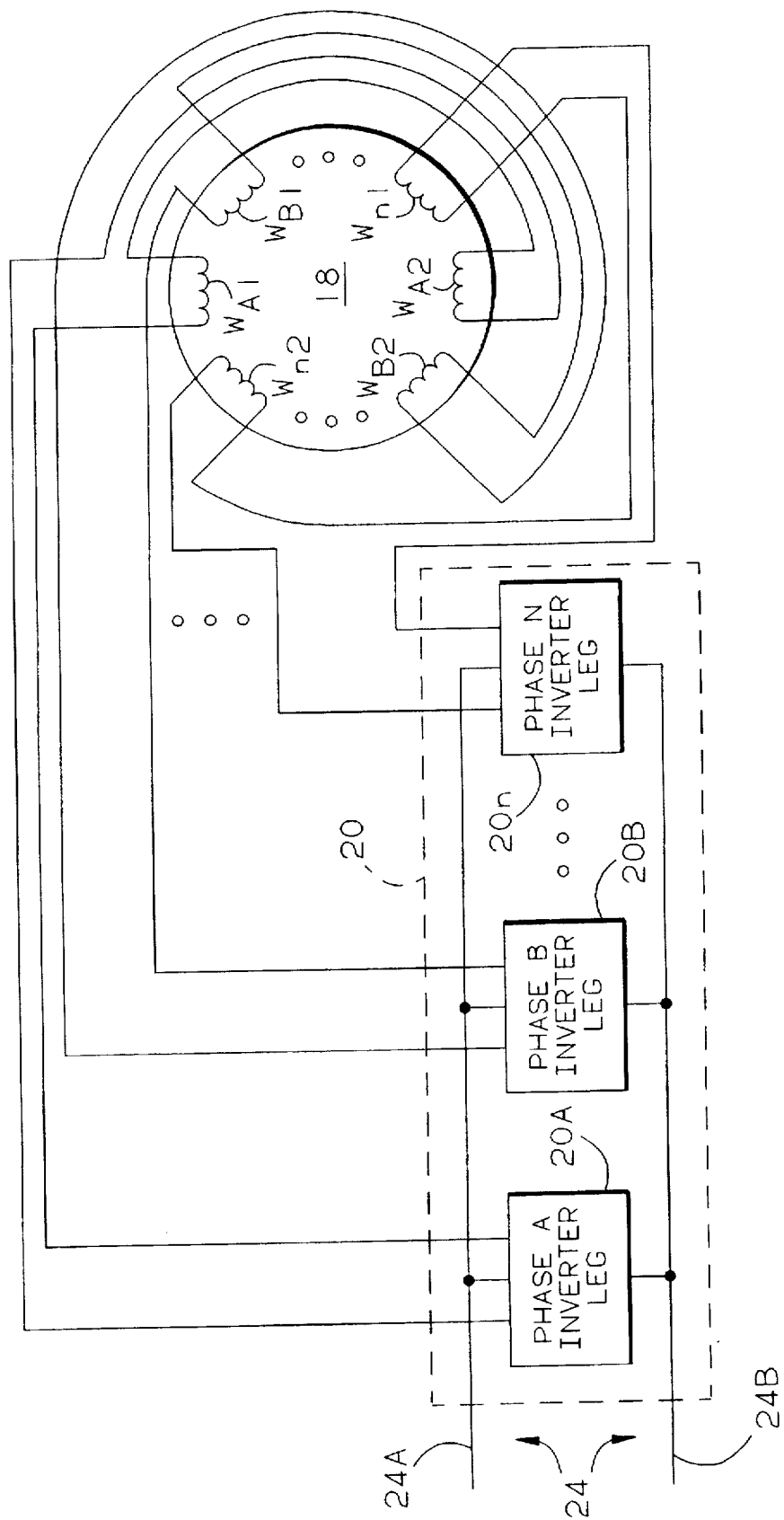
FIG. 2 comprises a block diagram illustrating the inverter and switched reluctance machine of FIG. 1 in greater detail.

Referring now to FIG. 2, the machine 18 is illustrated as including n phases comprising windings WA, WB, ... Wn, each of which includes two winding portions WA1 and WA2, WB1 and WB2, ... Wn1 and Wn2. Each winding WA, WB, ... Wn is connected to an associated leg 20A, 20B, . . . ,20n, respectively, of the inverter 20. Each inverter leg 20A–20n receives DC power over a DC link or bus 24 comprising DC link or bus conductors 24A, 24B.

Figure 3:
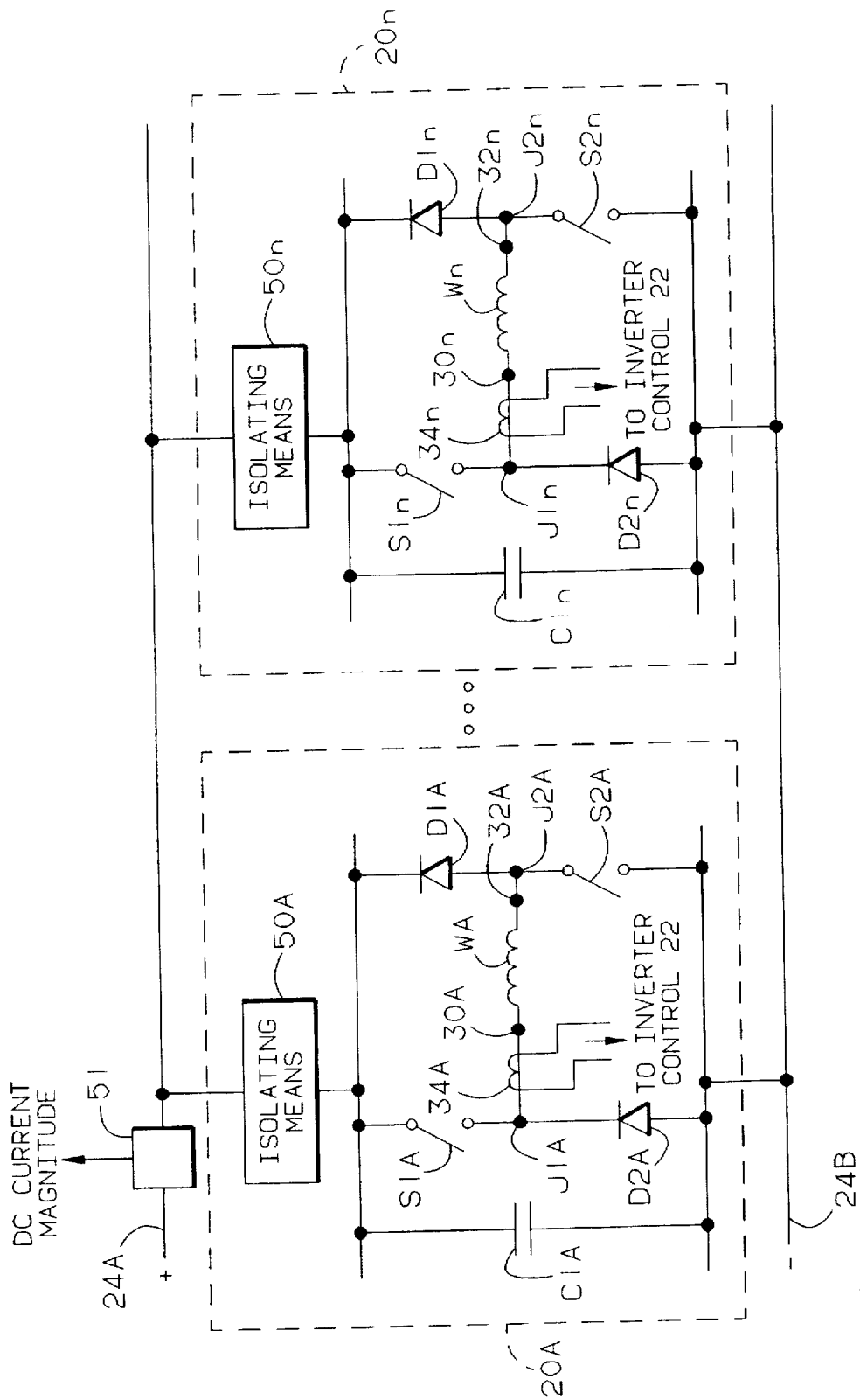
FIG. 3 comprises a simplified schematic diagram illustrating a portion of the inverter of FIG. 1 in greater detail.

FIG. 3 illustrates a first embodiment of the present invention that may be used as the inverter 20 of FIGS. 1 and 2. According to the present invention, each inverter leg 20A–20n comprises a module coupled across the DC bus conductors 24A, 24B. The inverter legs 20A–20n are identical, and hence only the inverter leg 20A will be described in detail, it being understood that elements in the inverter leg 20n corresponding to those described hereinafter in connection with the inverter leg 20A are assigned like reference numerals, with the exception that the letter n is substituted for the letter A therein. The inverter leg 20A includes first and second controllable power switches S1A and S2A connected in a bridge configuration with power diodes D1A and D2A across the DC link conductors 24A and 24B. The phase winding WA includes a first terminal coupled by a feeder 30A to a junction J1A between the switch S1A and the diode D2A. A second terminal of the phase winding WA is coupled by a feeder 32A to a junction J2A between the diode D1A and the power switch S2A. A current sensor 34A is adapted to sense the current flowing in the phase winding WA and is coupled to the inverter control 22 of FIG. 1.

An inverter leg DC bus capacitor C1A is coupled across the DC bus conductors 24A and 24B and provides filtering for the power developed thereon. The bus capacitor C1A provides 1/nth of the overall DC bus capacitance provided by the inverter 20.

Figure 5A:
FIGS. 5a–5c comprise schematic diagrams of isolation means according to the present invention.
Figure 5B:
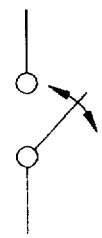
Figure 5C:

In accordance with the present invention, means 50A is provided for isolating the inverter leg from the remaining modules forming the inverter 20. Preferably, the isolating means 50A comprises a disconnect device which is opened to isolate the capacitor C1A in the event of a fault thereof or any other failed component in the module from the DC link conductors 24A and 24B. Specifically, as seen in FIG. 5a, the isolating means 50 may comprise a fuse which opens simply in response to increased current flow therethrough owing to a short circuit condition caused by the failed capacitor C1A or other component. In alternative embodiments, seen in FIGS. 5b and 5c, the isolating means 50 may comprise a controllable switch or a set of contactors operated by a relay wherein the controllable switch or relay is responsive to a control signal. In either case, the control signal may be generated in response to a high sensed current level at an appropriate point either in the inverter leg 20A or on the DC bus 24. For example, the current sensor may detect the current flowing through the isolating means 50A or the capacitor C1A or may sense the current flowing through one of the DC link conductors 24A or 24B. In the event that the current magnitude through either of the bus conductors 24A or 24B is sensed, the inverter control 22 may isolate the fault by utilizing fault isolation techniques that employ various inverter components, such as the isolation means 50A–50n, the current sensors 30A–30n and a DC link current sensor 51. For example, the control 22 may be adapted to sequentially deactivate the inverter legs 20A–20n in accordance with a command provided to the isolating means and sense when the overcurrent condition disappears to determine which inverter leg 20A–20n includes the faulty bus capacitor or other component therein. When the fault is so isolated, the inverter leg containing the fault may thereafter be disabled. In this embodiment, the isolating means must be individually controllable so that the inverter leg containing the fault can be isolated.

Figure 4:
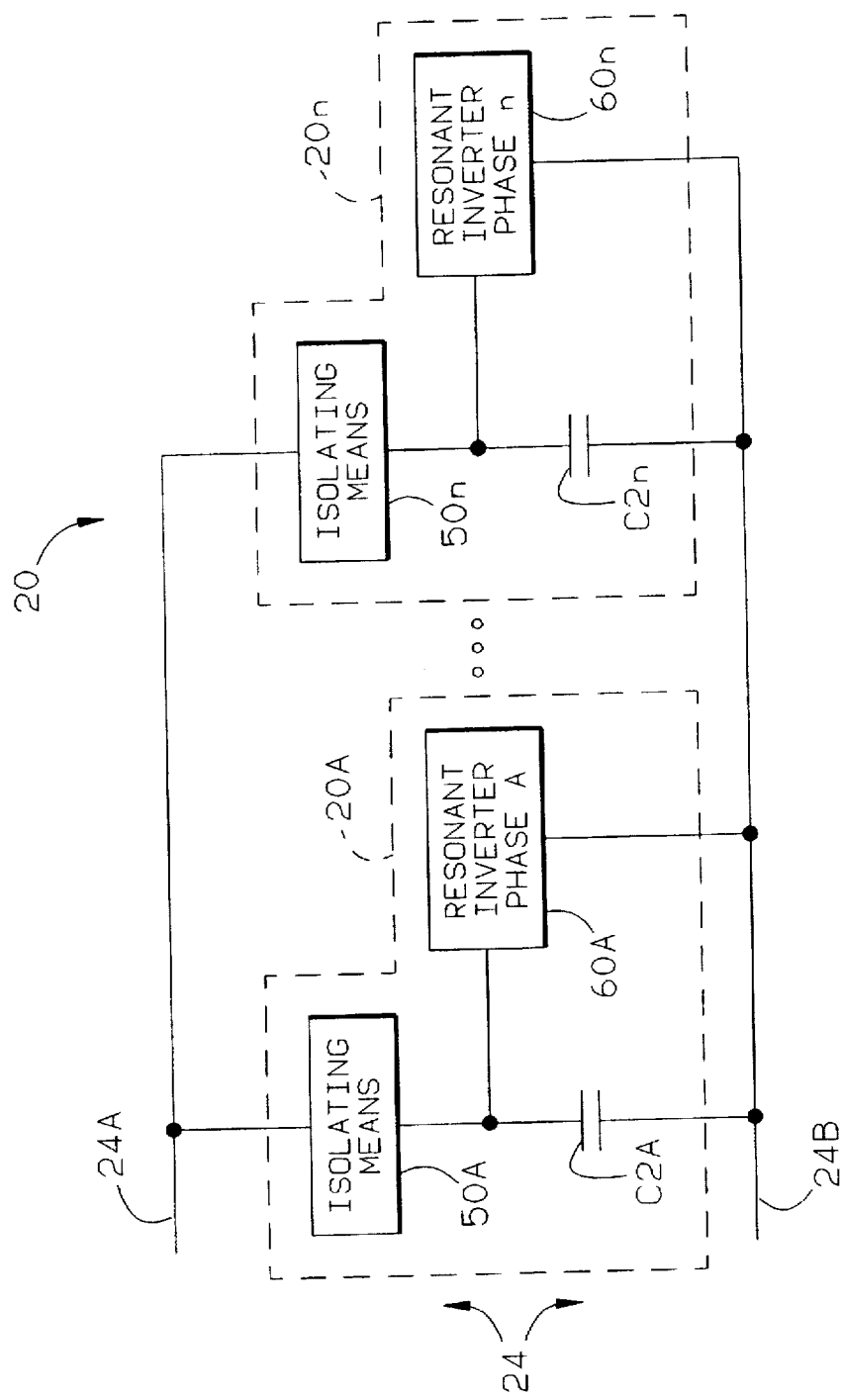
FIG. 4 comprises a combined simplified schematic and block diagram of a further embodiment of the present invention that may be used in place of the inverter of FIG. 3.

FIG. 4 illustrates an alternative embodiment of the present invention wherein the inverter 20 is of the soft-switched type, rather than the hard-switched type disclosed above in connection with FIG. 3. Specifically, the inverter 20 is of a resonant design including inverter legs 20A–20n each of modular construction where, as in the embodiment of FIG. 3, the inverter legs 20A–20n are identical and hence only the leg 20A will be described in detail. A DC bus capacitor C2A is coupled by the isolating means 50A of FIG. 3 across the DC bus conductors 24A, 24B. The balance of the inverter leg 20A is represented by a block 60A having resonant components, switching devices and diodes coupled to the winding WA of the machine 18 of FIGS. 1 and 2. Inasmuch as the components within the block 60A are not relevant to an understanding of the present invention, they will not be described in detail herein.

Also as in the embodiment of FIG. 3, each DC bus capacitor C2A–C2n provides 1/nth the total DC bus capacitance provided by the inverter 20.

As in the embodiment of FIG. 3, in the event that any of the DC bus capacitors C2A–C2n or other component fails in a shorted condition, the isolating means 50A–50n connected thereto may be opened to isolate the failed component from the DC bus conductors 24A and 24B. As before, the isolating means 50A–50n may comprise fuses, controllable switches, contactors or any other suitable device(s). Still further as in the previous embodiment, in the event that the isolating means 50A–50n are controllable, such devices may be opened in response to a sensed overcurrent condition in any one of the DC bus conductors 24A, 24B, the current through the respective isolating means 50A–50n or the current through the capacitor C2A–C2n connected thereto.

As should be evident from the foregoing, the present invention provides increased fault tolerant capability due to the fact that the inverter leg containing the faulty capacitor or other component can be isolated from the DC link 24, and hence from the remaining inverter legs, so that operation of the switched reluctance machine 18 can continue. This, in combination with the inherent fault tolerant capability of the machine 18, leads to a desirable overall increase in fault tolerant capability with only a modest increase in component count and cost.

The present invention is not limited to use in the examples noted above, and, in fact, can be used with any switched reluctance starter/generator or any motor drive in any application, not just on aircraft.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A power converter, comprising:
   a power bus; and
   a plurality of converter legs each connected to the power bus and each including a bus capacitor, a switching stage coupled to the bus capacitor and means for isolating the bus capacitor from the power bus in the event of a fault in the bus capacitor.

2. The power converter of claim 1, wherein the power bus comprises a pair of bus conductors and wherein the isolating means and the bus capacitor are coupled together in series across the pair of bus conductors.

3. The power converter of claim 1, wherein each isolating means comprises a fuse.

4. The power converter of claim 1, wherein each isolating means comprises a controllable switch.

5. The power converter of claim 1, wherein each isolating means comprises a set of contactors.

6. An inverter for operating a switched reluctance machine, comprising:

a DC power bus; and a plurality of inverter legs each coupled to the DC power bus and each including a DC bus capacitor, a switching stage coupled to the DC bus capacitor and means for isolating the DC bus capacitor from the DC power bus in the event of a fault in the DC bus capacitor.

7. The inverter of claim 6, wherein the DC power bus includes first and second DC bus conductors and wherein each isolating means is coupled between a first terminal of the DC bus capacitor and the first DC bus conductor and a second terminal of the DC bus capacitor is coupled to the second DC bus conductor.

8. The inverter of claim 6, wherein each isolating means comprises a fuse.

9. The inverter of claim 6, wherein each isolating means comprises a controllable switch.

10. The inverter of claim 6, wherein each isolating means comprises a set of contactors.

11. The inverter of claim 6, wherein each switching stage is of the hard-switched type.

12. The inverter of claim 6, wherein each switching stage is of the soft-switched type.

\* \* \* \* \*